US012725148B2

(12) United States Patent
Hurry et al.

(10) Patent No.: US 12,725,148 B2
(45) Date of Patent: Sep. 1, 2026

(54) TECHNIQUES FOR SECURELY COMMUNICATING SENSITIVE DATA

(71) Applicant: Visa International Service Association, San Francisco, CA (US)

(72) Inventors: Simon Hurry, Foster City, CA (US); Christian Aabye, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/268,883

(22) PCT Filed: Aug. 17, 2018

(86) PCT No.: PCT/US2018/046977
§ 371 (c)(1),
(2) Date: Feb. 16, 2021

(87) PCT Pub. No.: WO2020/036608
PCT Pub. Date: Feb. 20, 2020

(65) Prior Publication Data

US 2021/0326866 A1 Oct. 21, 2021

(51) Int. Cl.
*G06Q 20/38* (2012.01)
*G06Q 20/02* (2012.01)
*G06Q 20/40* (2012.01)

(52) U.S. Cl.
CPC ....... *G06Q 20/3823* (2013.01); *G06Q 20/023* (2013.01); *G06Q 20/3829* (2013.01); *G06Q 20/401* (2013.01)

(58) Field of Classification Search
CPC ............. G06Q 20/3823; G06Q 20/023; G06Q 20/3829; G06Q 20/401; G06Q 20/382; G06Q 20/40; G06Q 20/409
(Continued)

(56) References Cited

U.S. PATENT DOCUMENTS 7,581,153 B2 * 8/2009 Micheloni ........... G06F 11/1048 714/763
7,584,153 B2 * 9/2009 Brown .................. G07F 7/1008 705/50
(Continued)

FOREIGN PATENT DOCUMENTS

CN 107077670 A 8/2017
CN 107251476 A 10/2017
(Continued)

OTHER PUBLICATIONS

Application No. PCT/US2018/046977 , International Search Report and Written Opinion, Mailed on Dec. 6, 2018, 14 pages.
(Continued)

*Primary Examiner* — Zeshan Qayyum
(74) *Attorney, Agent, or Firm* — Kilpatrick Townsend & Stockton LLP

(57) ABSTRACT

Systems and methods are disclosed for securely communicating sensitive such as an identifier. An encrypted value may be generated utilizing at least a portion of the identifier, a dynamic value, and an encryption key. An obfuscated identifier may be generated using at least a portion of the unencrypted identifier and a portion of the encrypted value. The obfuscated identifier and the encrypted value may be provided in a message to inhibit potential fraudsters from obtaining the identifier.

16 Claims, 5 Drawing Sheets

(58) Field of Classification Search
USPC ........................................................ 705/64
See application file for complete search history.

(56) References Cited

U.S. PATENT DOCUMENTS

| | | | | |
|---|---|---|---|---|
| 8,898,089 | B2 * | 11/2014 | Faith | H04L 9/32 705/75 |
| 8,972,303 | B2 * | 3/2015 | Hammad | G06Q 20/40 705/64 |
| 10,664,844 | B2 * | 5/2020 | Narayan | H04L 63/0892 |
| 2009/0030845 | A1 | 1/2009 | Hurry et al. | |
| 2009/0171849 | A1 | 7/2009 | Hammad | |
| 2009/0313168 | A1 * | 12/2009 | Manessis | G06Q 20/20 705/44 |
| 2010/0179909 | A1 | 7/2010 | Dana | |
| 2011/0225094 | A1 * | 9/2011 | Hammad | G06Q 20/401 705/44 |
| 2013/0132283 | A1 * | 5/2013 | Hayhow | G06Q 20/1085 705/67 |
| 2013/0226802 | A1 | 8/2013 | Hammad et al. | |
| 2016/0119119 | A1 | 4/2016 | Calapodescu et al. | |
| 2016/0189138 | A1 | 6/2016 | Hird et al. | |
| 2017/0228728 | A1 | 8/2017 | Sullivan | |
| 2017/0243203 | A1 | 8/2017 | Bond et al. | |

FOREIGN PATENT DOCUMENTS

| | | | | |
|---|---|---|---|---|
| JP | 2011172230 | A | 9/2011 | |
| WO | 2007149762 | | 12/2007 | |
| WO | 2009003080 | | 12/2008 | |
| WO | 2013103991 | | 7/2013 | |
| WO | WO-2017160843 | A1 * | 9/2017 | G06F 21/602 |

OTHER PUBLICATIONS

Office Action, mailed Apr. 29, 2023, for Chinese Application No. CN201880096711.X, 23 pages.

Application No. SG11202101145W, Written Opinion, Mailed on Nov. 15, 2022, 5 pages.

Office Action, mailed May 1, 2024, Chinese Application No. CN201880096711.X, 11 pages.

Office Action, mailed Feb. 3, 2024, Chinese Application No. CN201880096711.X, 23 pages.

EP18778591.0, “Office Action”, Mar. 23, 2023, 9 pages.

Notice of Decision to Grant, mailed Jul. 29, 2024, for Chinese Patent Application No. CN201880096711.X, 5 pages.

Intention to Grant, mailed Jul. 8, 2025, for European Patent Application No. EP18778591.0, 8 pages.

* cited by examiner 300
302
303
304
306
308
310
312
314
316
318
320
321
322
323

TECHNIQUES FOR SECURELY COMMUNICATING SENSITIVE DATA

CROSS-REFERENCE TO RELATED APPLICATION

This application is the U.S. National Phase of International Patent Application No. PCT/US2018/046977, filed Aug. 17, 2018, entitled "TECHNIQUES FOR SECURELY COMMUNICATING SENSITIVE DATA", which is hereby incorporated by reference in its entirety.

BACKGROUND

Embodiments of the present disclosure relate to obfuscating sensitive data within messages utilized in a transaction. These techniques can be applied to contact and/or contactless smart card transactions. Generally, contactless smart cards are designed to provide a consumer with an efficient method of payment. The smart cards are able to provide required information to a point of sale (POS) device to complete the transaction by using, for example, radio frequency or infrared signals. The POS device receives the provided information and may process a transaction.

The information sent by a smart card can include sensitive data such as a user's account identifier (e.g., a personal account number). As a result, security measures are needed to protect the user from sophisticated fraudsters who may intercept this information. Current techniques may be problematic because the entire account identifier is unencrypted. In other conventional techniques, the account identifier may be encrypted but is still transmitted and/or provided according to a known protocol having known data fields. An intelligent fraudster may still easily identify the encrypted data field within a message and are thus, more likely to be able to utilize the information for their nefarious acts. Additionally, using conventional techniques, the account identifier may remain static, potentially allowing a fraudster to track a user's transactions.

Embodiments of the invention address these and other problems, individually and collectively.

BRIEF SUMMARY

Embodiments of the present invention are directed to methods, systems, devices, and computer readable media that can be used to securely communicate an account identifier associated with a portable consumer device such as a contactless smart card. In some embodiments, the account identifier is communicated in a manner that does not allow the account identifier to be tracked for privacy protection. Advantageously, in embodiments of the invention, account information is communicated in a manner that is secure and that does not require updating the existing payment infrastructure in any significant way.

One embodiment of the invention is directed to a method comprising, obtaining, by a device, a unique derivation key. The method may further comprise obtaining, by the device, a dynamic value (e.g., at least one of a counter, date, time, and/or transaction value). The method may further comprise generating, by the device, an encrypted value by encrypting the identifier and the dynamic value using the unique derivation key. The method may further comprise storing, by the device, the encrypted identifier. The method may further comprise generating, by the device, an obfuscated identifier based at least in part on the portion of the identifier and a portion of the encrypted identifier. The method may further comprise providing, by the device, a message comprising at least the obfuscated identifier and the encrypted value to an access device, causing the access device to generate an authorization request message comprising a first data field comprising the obfuscated identifier and a second data field comprising the encrypted value for transmission to a central server computer for further authorization processing.

Another embodiment of the invention is directed to a computing device comprising one or more processors, and one or more memories comprising computer-executable instructions that, when executed by the one or more processors causes the computing device to perform operations. The operations may comprise obtaining, by a device, a unique derivation key. The operations may further comprise obtaining, by the device, a dynamic value. The operations may further comprise generating, by the device, an encrypted value by encrypting the identifier and the dynamic value using the unique derivation key. The operations may further comprise storing, by the device, the encrypted identifier. The operations may further comprise generating, by the device, an obfuscated identifier based at least in part on the portion of the identifier and a portion of the encrypted identifier. The operations may further comprise providing, by the device, a message comprising at least the obfuscated identifier and the encrypted value to an access device, causing the access device to generate an authorization request message comprising a first data field comprising the obfuscated identifier and a second data field comprising the encrypted value for transmission to a central server computer for further authorization processing.

Another embodiment of the invention is directed to a (non-transitory) computer readable medium. The computer readable medium comprises code for performing the methods discussed herein. In some embodiments, a computing device such as a smart card may comprise this computer-readable medium.

These and other embodiments of the invention are described in further detail below, with reference to the figures.

DETAILED DESCRIPTION

Figure 1:
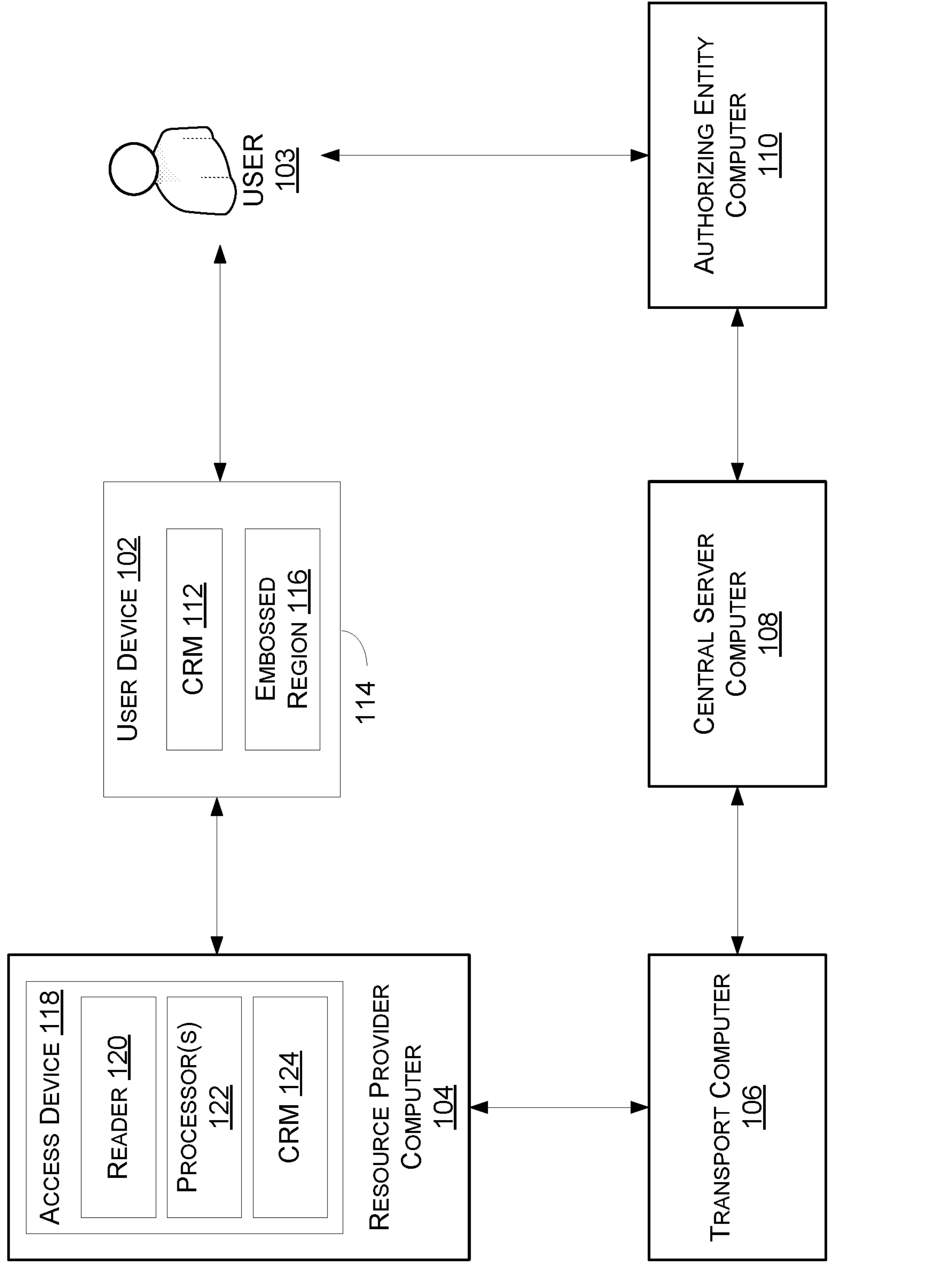
FIG. 1 shows a block diagram of a system for processing a transaction, according to some embodiments.

As described above, in a convention payment transaction, an account identifier (e.g., a personal account identifier) is not encrypted when it passes from a portable consumer device such as a contactless smart card to an access device (e.g., a POS terminal) and eventually through the traditional payment processing network. In some conventional techniques, the account identifier may be encrypted and/or obfuscated, however the encrypted/obfuscated data may still be provided in a traditional data field of a transaction message and thus, the data field is readily identifiable to potential fraudsters. Additionally, the encrypted and/or obfuscated data may also be static, which allows for a user's activity (e.g., transactions) to be tracked.

While encryption of the entire account identifier is possible, it may not be practical under all circumstances. If the account identifier is encrypted, a conventional transaction processing system may not be able to successfully process the transaction. For example, a typical account identifier includes a bank identification number (BIN). The BIN is used to route an authorization request message to the proper issuer or payment processor. If the account identifier is encrypted, then the BIN will change. If the BIN changes, then a proper authorization request message cannot be routed to the correct issuer.

Another restriction associated with encrypting the entire account identifier is related to an error check that is associated with the sequence of digits in an account identifier. Error checking may be achieved using a checksum algorithm that determines if the digits of the account identifier are in the proper sequence. An example checksum algorithm is a modulo 10 algorithm (which is also known as a "Luhn check").

Therefore, encryption of an entire account identifier would corrupt at least the BIN, the checksum, and the ability to identify an account identifier via printed digits on a receipt.

The processes described herein can be used to protect the account identifier at the initiating device (e.g., the smart card). As will be illustrated in further detail below, embodiments of the invention obfuscate only a portion of an account identifier, which allows the BIN the account to remain unencrypted and the Luhn check to continue to be utilized. In addition, embodiments of the invention can also be used not only obfuscate an account identifier within a typical authorization request message, but also to ensure that the entire encrypted account identifier is provided elsewhere in the message so as to make it less likely to be identifiable.

Before discussing detailed embodiments of the invention, some descriptions of certain terms may be useful.

A "computing device" (also referred to as a "user device") may be any suitable device that can perform computations, and that can communicate with other devices. A portable consumer device such as a smart card is an example of a computing device. Other types of computing devices may not be portable.

A "dynamic value" is intended to refer to a value that changes dynamically. The computing device can maintain various dynamic values. An example of a dynamic value is an application transaction counter (ATC). The ATC may initially be set by the issuer of the computing device (e.g., an authorizing entity) to a predetermined value. Thereafter, the ATC may be incremented with each transaction. Alternately, the ATC may be decremented from its initial predetermined value with each transaction. The ATC may be a value of any length. In addition, the issuer may maintain a corresponding ATC accessible to the issuer's computer. This corresponding ATC may be used to identify payment services which may have been replayed for fraudulent purposes. In an alternate embodiment, a cryptogram, digital signature, or hash value based on transaction data may be used in place of or in conjunction with the ATC stored at the computing device.

Examples of other dynamic values (e.g., data elements) may include a time of day, a current transaction amount, and a randomly generated number from a terminal, etc. The data elements are dynamic in the sense that they can change with each transaction or nearly each transaction. The dynamic data elements may relate to a user's computing device and/or may relate to the user generally.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authorizing entity computer" may be operated by, or on behalf of, an authorizing entity.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A "resource provider computer" may be any suitable computing device that may be operated by, or on behalf of, a resource provider.

A "processing network computer" (also referred to as a central server computer) may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

An "obfuscated identifier" may include an identifier that is an obfuscated version of an identifier (e.g., a 16 digit personal account number). In some embodiments, an obfuscated identifier may be "format preserving" and may have a numeric format that conforms to the account identifiers used in existing transaction processing networks (e.g., ISO 8583 financial transaction message format). In some embodiments, an obfuscated identifier may be used in place of a PAN to initiate, authorize, settle or resolve a payment transaction or represent the original credential in other systems where the original credential would typically be provided.

An "encrypted value" may include any suitable encrypted version of value. An encrypted value may be generated from a value (e.g., an identifier) utilizing any suitable encryption techniques utilizing, for example, symmetric and/or asymmetric encryption techniques.

For purposes of this application, "payment data" can include, with respect to financial applications those data elements used by the payment service to execute a transaction, and with respect to non-financial transactions any necessary data elements exclusive of the present invention. For example, when the payment service is a magnetic stripe credit card transaction, "payment data" would comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider. The payment data may reside in a memory located on the user device (e.g., a credit and/or debit card, a smart card, etc.).

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a system 100 for processing a transaction, according to some embodiments. The system 100 may be used to facilitate data communications between the various computers depicted in FIG. 1 for authentication and/or authorizing financial and non-financial transactions. The system 100 includes a user device 102, a resource provider computer 104, a transport computer 106, a central server computer 108, and an authorizing entity computer 110. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The resource provider computer 104 may be operated by or on behalf of a resource provider (e.g., a merchant) and the transport computer may be associated with the resource provider. For example, the transport computer may be operated by an acquirer (e.g., a financial institution) responsible for managing an account associated with the resource provider. The authorizing entity computer 110 may be operated by an issuer (e.g., another financial institution). In some embodiments, entities are both acquirers and issuers, and embodiments of the invention include such entities.

The user device 102 may be in any suitable form. For example, the user device 102 can be hand-held and compact so that it can fit into a wallet and/or pocket. Examples of the user device 102 may include smart cards, credit and/or debit cards, key chain devices, or the like. Other examples of the user device 102 may include cellular phones, personal digital assistants (PDAs), pagers, payment cards, security cards, access cards, smart media, transponders, and the like. The user device 102 can also be a stored value card for storing retail store credit or the like.

The user device 102 may comprise a computer readable medium (CRM) 112 and a body 114. The CRM 112 may be on the body 114, which may in the form a plastic substrate, housing, or other structure. If the user device 102 is in the form of a card, it may have an embossed region 116 which is embossed with the primary personal account number (PAN).

The computer readable medium 112 may be a memory that stores data and may be in any suitable form. Exemplary CRM 112 may be in the form of a magnetic stripe, a memory chip, etc. The computer readable medium 112 may electronically store the primary and/or an encrypted and/or obfuscated PAN in encrypted or unencrypted form.

The central server computer 108 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base 11 system which performs clearing and settlement services.

The central server computer 108 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The central server computer 108 may use any suitable wired or wireless network, including the Internet.

The resource provider computer 104 may also have, or may receive communications from, an access device 118 that can interact with the user device 102. In FIG. 1, the access device 118 is located at the resource provider computer 104. However, it could be located at any other suitable location in other embodiments of the invention. The resource provider computer 104 may include any suitable computational apparatus operated by a resource provider (e.g., a merchant). In some embodiments, the resource provider computer 104 may include one or more server computers that may host one or more websites associated with the resource provider (e.g., a merchant). In some embodiments, the resource provider computer 104 may be configured to send data to a central server computer 108 via a transport computer 106 as part of a payment verification and/or authentication process for a transaction between the user (e.g., consumer) and the resource provider. The resource provider computer 104 may also be configured to generate authorization request messages for transactions between the resource provider and the user 103, and route the authorization request messages to the authorizing entity computer 110 (e.g., via the central server computer 108) for additional transaction processing.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The access device 118 may include a reader 120, a processor 122, and a computer readable medium 124. The reader 120 may use any suitable contact or contactless mode of operation. For example, exemplary card readers can include RF (radio frequency) antennas, magnetic stripe readers, etc. to interact with the user device 102.

In a typical transaction, the user 103 purchases a good or service at the resource provider computer 104 using the user device 102 (e.g., a credit card). The user device 102 can interact with an access device 118 such as a POS (point of sale) terminal. For example, the user 103 may take a credit card and may swipe it through an appropriate slot in the POS terminal. Alternatively, the POS terminal may be a contactless reader, and the user device 102 may be a contactless device such as a contactless card.

An authorization request message is then forwarded to the transport computer 106. The transport computer 106 is typically associated with a business entity (e.g., a commercial bank) that has a business relationship with a particular resource provider (e.g., merchant) or other entity and that may be involved in the process of transaction. The transport computer 106 may issue and manage accounts for resource providers and exchange funds with the authorizing entity computer 110 on behalf of the resource provider. Some entities can perform both authorizing entity computer 110 and transport computer 106 functions. Embodiments of the present invention encompass such single entity issuer-acquirer computers. After receiving the authorization request message, the transport computer 106 may send the authorization request message to the central server computer 108. The central server computer 108 may then forward the authorization request message to the authorizing entity computer 110, or a third party entity acting on behalf of the authorizing entity, of the user device 102.

The central server computer 108 may be a network that includes or operates at least one server computer used for processing (e.g., payment processing). The server computer in the central server computer 108 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the central server computer 108 may operate multiple server computers. In such embodiments, each server computer may be configured to process transaction for a given region or handles transactions of a specific type based on transaction data.

The central server computer 108 may include data processing subsystems, networks, and operations used to support and deliver authorization services, exception file services, and clearing and settlement services. The central server computer 108 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The central server computer 108 may process transaction request messages and determine the appropriate destination (e.g., authentication computer(s)) for the transaction request messages. The central server computer 108 may also handle and/or facilitate the clearing and settlement of transactions.

The authorizing entity computer 110 is typically associated with a business entity (e.g., a bank) which issues and maintains consumer accounts for a consumer. The authorizing entity computer 110 may issue payment devices for the consumer account, including credit cards and debit cards, and the like.

After the authorizing entity computer, or a third party entity acting on behalf of the authorizing entity, receives the authorization request message, the authorizing entity computer 110, or the third party entity acting on behalf of the issuer, sends an authorization response message back to the central server computer 108 to indicate whether or not the current transaction is authorized (or not authorized). The central server computer 108 then forwards the authorization response message back to the transport computer 106. The transport computer 106 then sends the response message back to the resource provider computer 104.

After the resource provider computer 104 receives the authorization response message, the access device 118 at the resource provider computer 104 may then provide the authorization response message for the user 103. The response message may be displayed by the access device 118, or may be printed out on a receipt.

At the end of the day, a normal clearing and settlement process can be conducted by the system 100. A clearing process is a process of exchanging financial details between and acquirer and an issuer to facilitate posting to a user's account and reconciliation of the user's settlement position.

In at least one embodiment, the authorizing entity may conduct a personalization process for the user device 102. During this personalization process, a master derivation key (MDK) and a personal account identifier (otherwise referred to as an "identifier" may be stored at the user device 102 (e.g., within CRM 112). The user device 102 may be configured to perform functionality to derive one or more unique derivation keys (e.g., a unique derivation key (UDK) from the master key. In some embodiments, the user device 102 may derive a UDK using the master key and at least a portion of the identifier. For example, the UDK may be derived using the master key and a left-most 8 digits of the identifier.

Once generated, the UDK may be obtained to generate an obfuscated identifier. In some embodiments, the UDK may encrypt the entire identifier as well as a dynamic value such as a counter, date, time, and/or transaction amount. By way of example, a PAN may be concatenated with a dynamic value (e.g., a transaction counter) stored on the user device 102 and encrypted using the UDK and an encryption algorithm. The a portion of the encrypted value (e.g., the right-most 7 digits) may be identified and used to generate an obfuscated identifier. In some embodiments, the obfuscated identifier may include the original 8 digits of the identifier (corresponding to a BIN), the portion of the encrypted value, and a checksum value (e.g., corresponding to a Luhn checksum). In still further embodiments, the obfuscated identifier may include the original 8 digits of the identifier (corresponding to a BIN), any suitable number of padding values (e.g., 7 zeros), and a checksum value. The obfuscated value may be stored at the user device 102.

Upon initialization of a transaction, or at another suitable time, the user device 102 may be configured to provide the obfuscated value and the encrypted value in the form of a data track. A data track can be formatted as a Track 1 or Track 2 data track. Track 1 ("International Air Transport Association") stored more information than Track 2, and contains the cardholder's name as well as account number and other discretionary data. This track is sometimes used by airlines when securing reservation with a credit card. Track 2 ("American Banking Association" (ABA)) is currently most commonly used. Track 2 may be read by ATMs and credit card checkers. The ABA designed the specifications of Track 2 and all world banks must abide by it. It contains the cardholder's account, an encrypted PIN, plus other discretionary data.

In some embodiments, the obfuscated value may be provided in a data field of the Track 2 data track traditionally including the user's account number (e.g., tag 57). In some embodiments, the encrypted value may be provided in a different portion of the Track 2 data track (e.g., in Tag 9F1F (Discretionary Data tag), in Tag 9F7C (Customer Exclusive Data Tag), in Tag 9F10 (Issuer Application Data), or in any suitable portion of the Track 2 data, or any suitable combination of the above).

According to traditional transaction processing, the access device 118 may receive the Track 2 data track and provide the data to the resource provider computer 104 which may then forward at least a portion of the Track 2 data to the transport computer 106 via an authorization request message. In some embodiments, the access device 118 may generate the authorization request message, include at least a portion of the track 2 data and forward the authorization request message directly to the transport computer 106.

Upon receipt, or at another suitable time, the transport computer 106 may forward the authorization request message to the central server computer 108. The central server computer 108 may determine that the encrypted value is present in the authorization request message. The central server computer 108 may retrieve a stored UDK and/or derive the UDK utilizing the master derivation key and a portion of the obfuscated identifier (also included in the authorization message). The UDK may be utilized by the central server computer 108 to decrypt the encrypted value to obtain the entire unencrypted PAN. In some embodiments, the central server computer 108 may modify the authorization request message to include the unencrypted PAN and transmit the modified authorization request message to the authorizing entity computer 110 for further processing.

In other embodiments, the central server computer 108 may utilize at least a portion of the obfuscated identifier (e.g., the first 8 digits corresponding to the BIN) to forward an unaltered authorization request message to the authorizing entity computer 110. The authorizing entity computer 110 may retrieve a stored UDK and/or derive the UDK utilizing the master derivation key and a portion of the obfuscated identifier (also included in the authorization message). The UDK may be utilized by the authorizing entity computer 110 to decrypt the encrypted value to obtain the entire unencrypted PAN.

The authorizing entity computer 110 may process the authorization request message and transmit an authorization response message back to the central server computer 108. In some embodiments, the authorization response message may include the obfuscated identifier and the encrypted value and exclude the unencrypted identifier.

The central server computer 108 may forward the authorization response message back to the resource provider computer 104 via the transport computer 106. After the resource provider computer 104 receives the authorization response message, the access device 118 at the resource provider computer 104 may then provide the authorization response message for the user 103. The response message may be displayed by the access device 118, or may be printed out on a receipt.

At the end of the day, a normal clearing and settlement process can be conducted by the system 100.

By utilizing the techniques described herein, a more secure manner for communicating sensitive data (e.g., a PAN) is enabled. Not only is the PAN encrypted and provided in a non-traditional data field, but the traditional data field which would normally include the PAN, instead includes an obfuscated value from which the PAN is unlikely to be determined. The obfuscated value may still include the original BIN ensuring that traditional routing techniques for the authorization request/response messages remain unchanged. The techniques described herein make it difficult, if not impossible, to identify the PAN from the authorization request/response messages. Additionally, in some embodiments, the PAN is encrypted using a dynamic value that is ever changing. Accordingly, the encrypted value and obfuscated value can change for each authorization request making it difficult, if not impossible, to track transactions for a particular user over time. Thus, utilizing the techniques discussed herein, privacy protection and security for transmitting sensitive data is improved.

Figure 2:
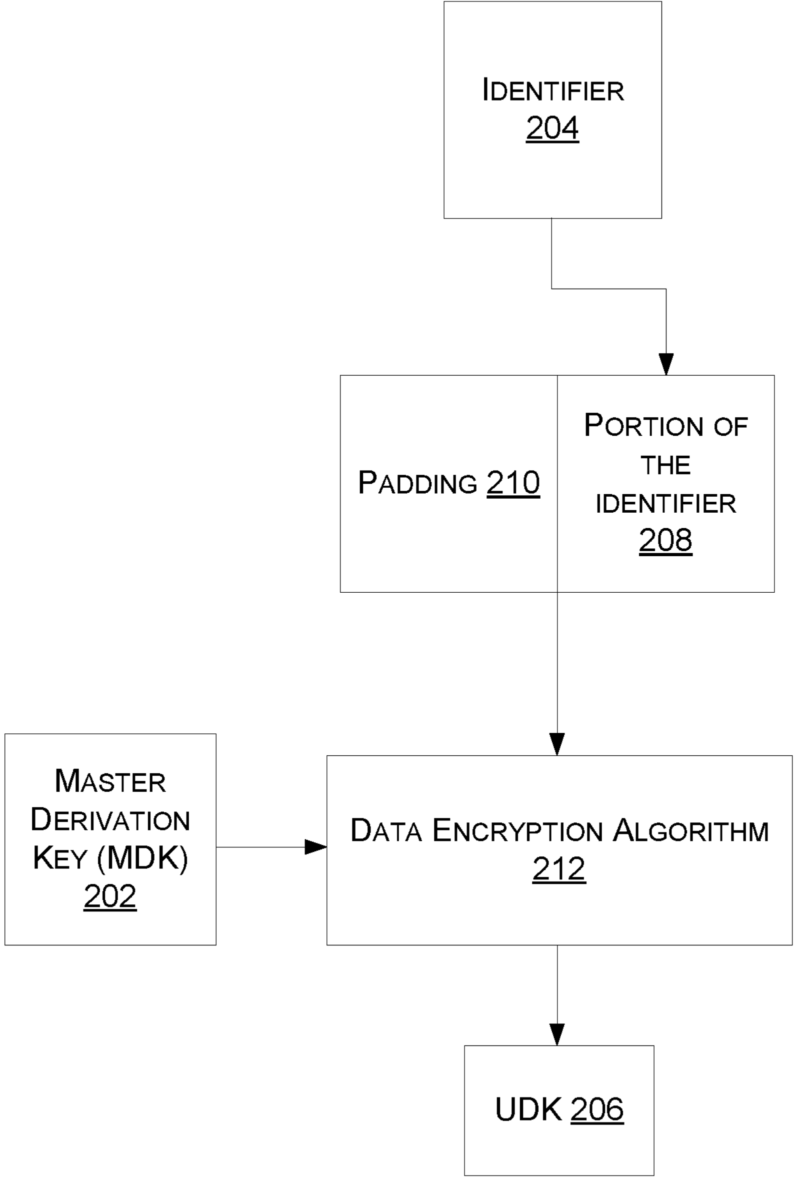
FIG. 2 depicts a method for generating a unique derived key from data residing on a computing device (e.g., a smart card), according to some embodiments.
Figure 2:

FIG. 2 depicts a method for generating a unique derived key from data residing on a computing device (e.g., a smart card), according to some embodiments. The method may be performed by the user device 102 of FIG. 1 utilizing one or more processors of the user device 102.

In at least one embodiment, the master derivation key (MDK) 202 and identifier 204 are stored at the user device 102 during performance of a personalization process. In some embodiments, the identifier 204 may be an example of a personal account number. The UDK 206 may be derived from such data existing on the user device 102.

By way of example, the user device 102 may be configured to identify a portion of the identifier 208. In some embodiments, the portion of the identifier 208 may include less than the entire identifier 204. For example, the portion of the identifier 208 may include a left-most 8 digits of the identifier 204. In some embodiments, the left-most 8 digits of the identifier 204 may correspond to a bank identification number (BIN) that may be used for routing purposes within a payment processing network (e.g., system 100).

In some embodiments, the portion of the identifier 208 may be concatenated with a number of padded bits (e.g., padding 210) to create a string of predetermined fixed length. In some examples, the concatenated value may be 128 bits in length where the padding comprises 64 bits and the portion of the identifier 208 comprises another 64 bits (8 digits comprising 8 bits each), although the concatenated value is not limited to being this length. The concatenated value may be provided, along with the MDK 202 as input into a data encryption algorithm 212.

The data encryption algorithm 212 may include any suitable encryption methodology. For example, the data encryption algorithm 212 may utilize a triple-DES encryption algorithm. In some embodiments, the value resulting from the encryption conducted by the data encryption algorithm 212 is the UDK 206.

Figure 3:
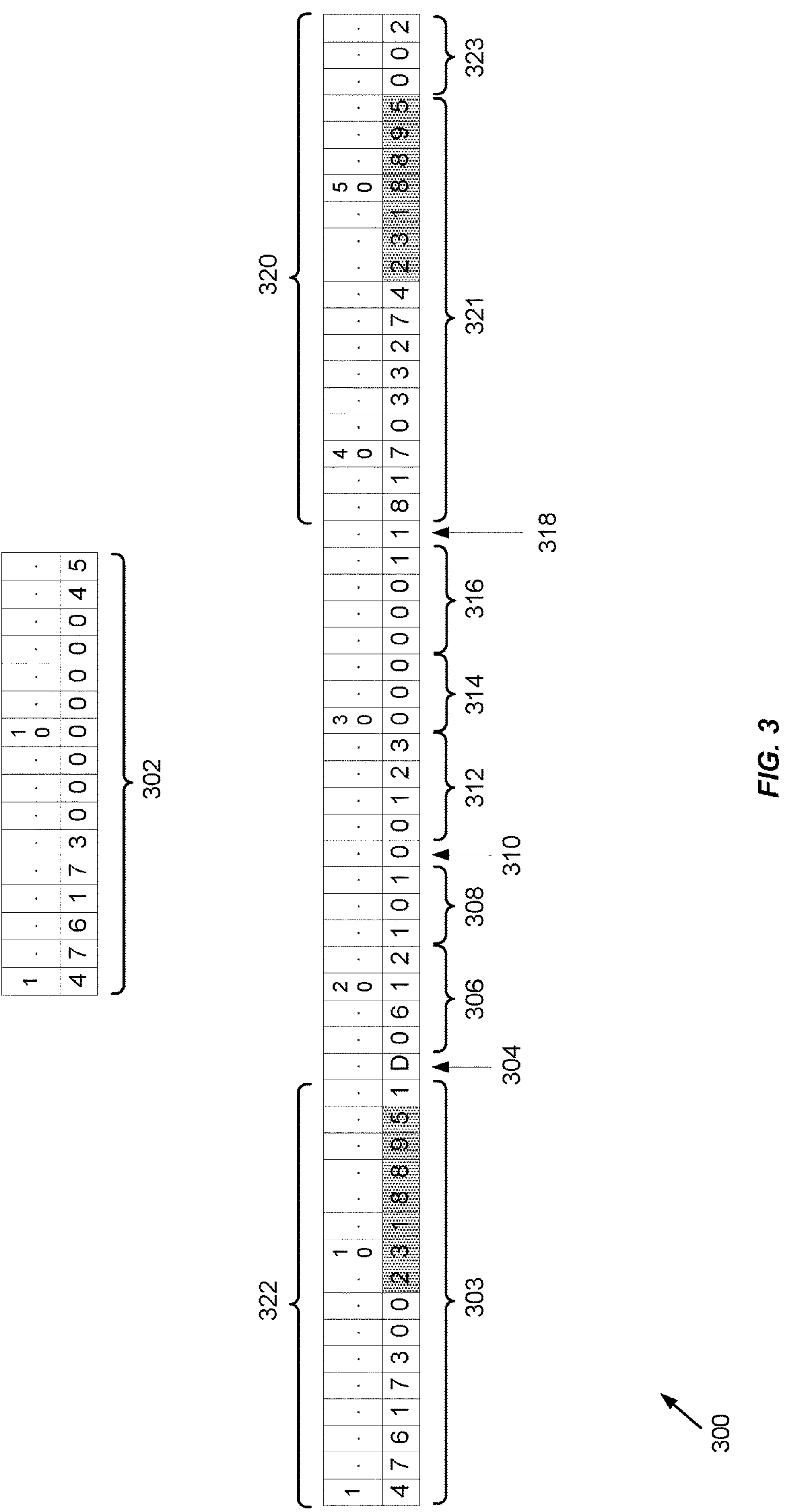
FIG. 3 depicts an exemplary record format for use in some embodiments.

FIG. 3 depicts an exemplary record format 300 for use in some embodiments. For example, the record format 300 may include track 2 data (e.g., payment data) including an obfuscated identifier and an encrypted value. In one non-limiting example, the PAN 302 may be associated with a user and stored on the user's device (e.g., a smartcard). As illustrated in FIG. 3, the PAN 302 may include 16 digits. In some embodiments, the PAN 302 is stored at Tag 57 of the Track 2 data as defined by the Track 2 data.

The first 16 digits (e.g., a identifier data field 303) of the record format 300 (e.g., digits 1-16) may traditionally be reserved the PAN 302. Next, a separator data field 304 provides a buffer between the account identifier and the expiration date data field 306. A service code data field 308 may follow the expiration date data field 306. A personal identification number verification indicator (PVKI) data field 310 and a PIN verification information data field 312 follow. Next, a dCVV data field 314, a transaction counter data field 316, and a contactless indicator data field 318 are included. Finally, a discretionary data field 320 follows. The discretionary data field may include an encrypted value data field 321 and a cryptogram version number data field 323. The encrypted value data field 321 and a cryptogram version number data field 323 may include any suitable number of digits, not necessary the number depicted in FIG. 3.

According to some embodiments, the PAN 302 may first be utilized to generate an encrypted value. By way of example, the user device 102 of FIG. 1 may be configured to retrieve the PAN 302 and the UDK 206 of FIG. 6 from storage. In some embodiments, a transaction counter (or other dynamic value) may also be retrieved. The PAN and the transaction counter (or other dynamic value) may be utilized together with the UDK 206 as input into an encryption algorithm to generate an encrypted value. In some embodiments, the PAN and the transaction counter (or other dynamic value) may be concatenated prior to input. The resultant encrypted value may be stored with the record format 300. By way of example, the resultant encrypted value may be stored as depicted within the encrypted value data field 321 of the discretionary data field 320. In some embodiments, discretionary data field 320 corresponds to a particular tag defined by the Track 2 standard (e.g., in Tag 9F1F (Discretionary Data tag), Tag 9F7C (Customer Exclusive Data Tag), in Tag 9F10 (Issuer Application Data), in any suitable portion of the Track 2 data, or any suitable combination of the above).

In some embodiments, the cryptogram version number data field 323 may store a number indicating that the discretionary data field 320 includes the encrypted value within the encrypted value data field 321.

According to some embodiments, the user device 102 may be configured to generate the obfuscated PAN 322. By way of example, the user device 102 may obtain the first 8 digits of the PAN 302 and store this information in digits 1-8 of the identifier data field 303. In at least one embodiments, the user device 102 may be configured to obtain some portion of the encrypted value and store the portion within the record format 300. For example, the last 7 digits of the encrypted value may be obtained an stored as digits 9-15 of the identifier data field 303. In some embodiments, the last 7 digits of the obfuscated PAN 322 may include any suitable number of padded values (e.g., zeros). For example, in some embodiments, digits 9-15 of the identifier data field 303 may include padding values such as zeros. Digit 16 of the identifier data field 303 may include a checksum value (e.g., a Luhn checksum/value) that may be utilized (e.g., on receipt) for verifying that the identifier data field 303 has not been altered.

Once a transaction has been initiated, the obfuscated PAN 322 and the encrypted value within discretionary data field 320 (e.g., at encrypted value data field 321) may be provided (e.g., to an access device as described above). The transaction counter can be incremented (or decremented) and/or a new dynamic value may be generated and stored in transaction counter data field 316. Should another transaction be initiated by the user device 102, the process discussed herein may be repeated utilizing the new transaction counter/dynamic value and the PAN 302 to generate a new encrypted value and a new obfuscated identifier which may then be provided in the subsequent transaction.

Figure 4:
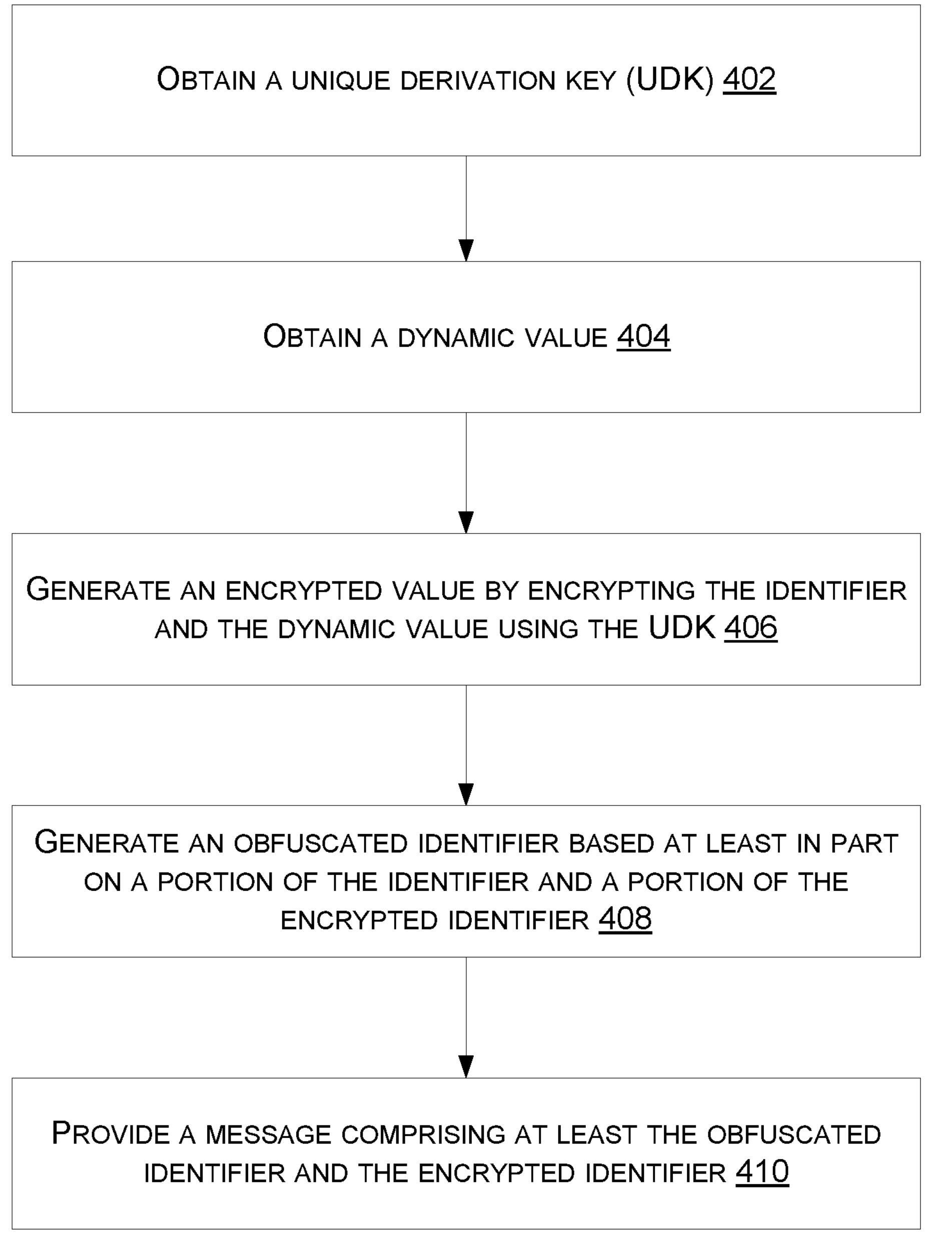
FIG. 4 shows a flowchart for a method for securely communicating sensitive data, according to some embodiments.

FIG. 4 shows a flowchart for a method 400 for securely communicating sensitive data, according to some embodiments. The method 400 may be performed by a computing device (e.g., the user device 102 of FIG. 1, a smart card). The computing device may comprise one or more processors and one or more memories storing computer-executable instructions, wherein executing the computer-executable instructions by the one or more processors, causes the computing device to perform the method 400. The steps shown in FIG. 4 and described below can be used in conjunction with the description of the transaction processing in FIG. 1 and its corresponding description. Those descriptions are herein incorporated by reference.

The method 400 may begin at block 402, where a unique derivation key (e.g., UDK 206 of FIG. 2) may be obtained (e.g., obtained from storage and/or derived). As discussed above, the UDK 206 may be initially derived utilizing at least a portion of an identifier (e.g., a PAN) and a master derivation key accessible to the computing device. In some embodiments, the portion of the identifier may include a number of digits less than the total amount of digits included in the identifier. By way of example, the identifier may be include 16 digits and the portion of the identifier may include the first 8 digits of those 16 digits. In some embodiments, the portion of the identifier may include a BIN.

At block 404, a dynamic value may be obtained. In some embodiments, the dynamic value may comprise at least one of a counter, a date, a time, a transaction value, a randomly generated value, or the like. The dynamic value may be stored at the computing device (e.g., the user device 102 of FIG. 1) and retrieved from storage.

At block 406, an encrypted value may be generated (e.g., by the user device 102) by encrypting the identifier and the dynamic value using the unique derivation key (e.g., the UDK 206). In some embodiments, the identifier and the dynamic value may be concatenated together and/or with additional padding values prior to being encrypted. In some embodiments, the encrypted value may be stored at the computing device (e.g., as part of Track 1 and/or Track 2 data such as Tag 9F7C (Customer Exclusive Data Tag) and/or Tag 9F10 (Issuer Application Data), in Tag 9F1F (Discretionary Data tag), or in any portion of the Track 1 and/or Track 2 data, or any suitable combination of the above. Additionally, or alternatively, the encrypted value may be provided as part of a data field reserved for future use potentially available in any of the Tags described above or another suitable portion of the Track 1 and/or Track 2 data.

At block 408, an obfuscated identifier may be generated (e.g., by the user device 102) based at least in part on the portion of the identifier and a portion of the encrypted identifier. By way of example, the obfuscated identifier may be generated to include a first 8 digits of the identifier and the last 7 digits of the encrypted identifier (or any suitable number of zeros). This is merely an example, more or fewer digits of the identifier and more or fewer digits of the encrypted identifier may be utilized. Similarly, the obfuscated may include 16 digits or any suitable number of digits. In some embodiments, a Luhn checksum value may be computed from the obfuscated identifier and included as part of the obfuscated identifier (e.g., the last digit, digit 16 in the ongoing example).

At block 410, a message (e.g., a Track 2 message) may be provided (e.g., by the user device 102). In some embodiments, the message may comprise at least the obfuscated identifier and the encrypted value. In some embodiments, a cryptogram version number may be included in the message to indicate that the obfuscated identifier and the encrypted value are included in the message. According to some embodiments, the message may be provided to an access device, which causes an authorization request message to be generated (e.g., by the access device 118 and/or the resource provider computer 104 of FIG. 1). The authorization request message may comprise, among other things, a first data field comprising the obfuscated identifier and a second data field comprising the encrypted value. In some embodiments, the authorization request message is transmitted a central server computer (e.g., the central server computer 108 of FIG. 1) for further authorization processing.

Figure 5:
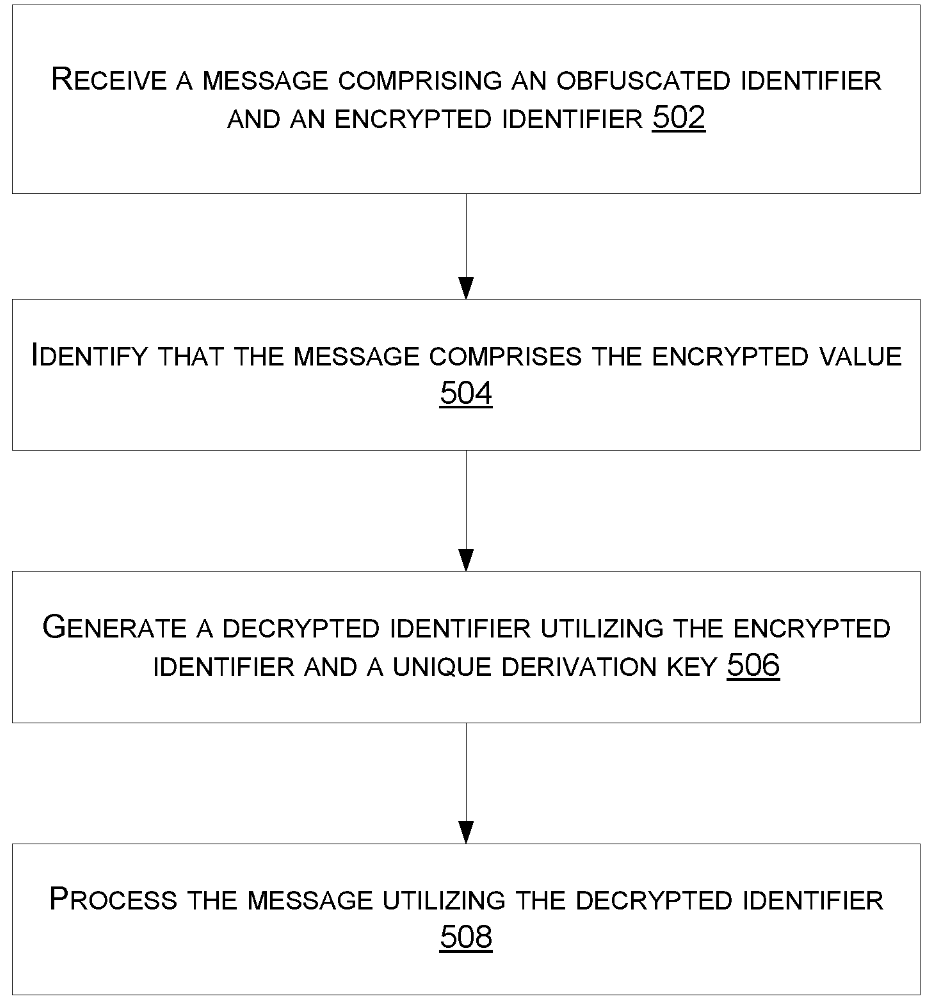
FIG. 5 shows a flowchart for another method for securely communicating sensitive data, according to some embodiments.
Figure 5:

FIG. 5 shows a flowchart for another method 500 for securely communicating sensitive data, according to some embodiments. The method 500 may be performed by a computing device (e.g., the central server computer 108 and/or the authorizing entity computer 110 of FIG. 1). The computing device may comprise one or more processors and one or more memories storing computer-executable instructions, wherein executing the computer-executable instructions by the one or more processors, causes the computing device to perform the method 500.

The method 500 may begin at block 502, where a message (e.g., an authorization request message) may be received. In some embodiments, the message may comprise an obfuscated identifier and an encrypted value. The obfuscated identifier and the encrypted value may have been generated according to the method 400 described above in connection with FIG. 4. The steps shown in FIG. 5 and described below can be used in conjunction with the description of the transaction processing in FIG. 1 and its corresponding description. Those descriptions are herein incorporated by reference.

At block 504, the computing device may identify that the message comprises the encrypted value. In some embodiments, identifying that the message comprises the encrypted value may include checking a particular data field (e.g., the discretionary data field 320 of FIG. 3) for a non-zero value. If the data field contains a non-zero value, the computing device may conclude that the encrypted value is present in the message. In some embodiments, identifying that the message comprises the encrypted value may include checking a particular data field (e.g., the cryptogram version number data field 323 of FIG. 3) for a non-zero value (or a particular value).

At block 506, the computing device may generate a decrypted identifier utilizing the encrypted identifier and a unique derivation key. In some embodiments, the computing device may derive the unique derivation key (UDK) from a portion of the obfuscated identifier. In some embodiments, the UDK may be previously derived and retrieved from storage. By way of example, the computing device may retrieve a left-most 8 digits of the obfuscated identifier and use those digits as input into a predetermined encryption algorithm to generate the UDK. Once the UDK has been generated, it may be utilized to decrypt the encrypted identifier.

At block 508, the message may be processed by the computing device utilizing the decrypted identifier. By way of example, the computing device may be a central server computer (e.g., the central server computer 108 of FIG. 1). In this scenario, processing the message (e.g., an authorization request message) may include modifying the message to include the decrypted identifier and transmitting the message to an authorizing entity computer (e.g., the authorizing entity computer 110) for further processing. In some embodiments, the computing device may be the authorizing entity computer 110. In this scenario, processing the message may include authorizing the transaction with the message data including the decrypted identifier. The processing may further include generating an authorization response message indicating that the transaction was approved or declined. The authorization response message may include the encrypted identifier and transmitted, for example, to the central server computer 108 according to the process described above in connection with FIG. 1.

Technical Improvements

By utilizing the techniques described herein, a more secure manner for communicating sensitive data (e.g., a PAN) is enabled. Not only is the PAN encrypted and provided in a non-traditional data field, but the traditional data field which would normally include the PAN, instead includes an obfuscated value from which the PAN is unlikely to be determined. The obfuscated value still may include the original BIN ensuring that traditional routing techniques for the authorization request/response messages remain unchanged. The techniques described herein make it difficult, if not impossible, to identify the PAN from the authorization request/response messages. Additionally, in some embodiments, the PAN is encrypted using a dynamic value that is ever changing. Accordingly, the encrypted value can change for each authorization request making it difficult, if not impossible, to track transactions for a particular user over time. Accordingly, these methods provide improvements regarding personal data privacy by ensuring that a particular user and/or account cannot be identified from the authorization request/response message.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:

obtaining, by a device, a unique derivation key;

obtaining, by the device, a dynamic value;

concatenating an identifier and the dynamic value to generate a concatenated value;

generating an encrypted identifier based on encrypting the concatenated value by inputting the unique derivation key and the identifier into an encryption algorithm, the identifier being a 16-digit primary account identifier;

generating, by the device, an obfuscated identifier based at least in part on a portion of the identifier and a portion of the encrypted identifier, the obfuscated identifier maintaining routing information of the 16-digit primary account identifier;

providing, by the device, the obfuscated identifier to an access device, causing the access device to populate a first data field of an authorization request message with the obfuscated identifier prior to transmitting the authorization request message to a central server computer, the first data field being previously associated with identifying primary account identifiers, wherein populating the first data field with the obfuscated identifier maintains the ability to utilize checksum algorithm-based error checking for the first data field; and providing, by the device, the encrypted identifier to the access device, causing the access device to populate a second data field of the authorization request message with the encrypted identifier prior to transmitting the authorization request message to the central server computer, wherein populating the second data field with the encrypted identifier instead of the first data field reduces an ability of a nefarious actor to identify the 16-digit primary account identifier from the authorization request message or to track the 16-digit primary account identifier across authorization request messages.

2. The computer-implemented method of claim 1, wherein the obfuscated identifier and the encrypted identifier are provided to the access device in a message, and wherein the computer-implemented method further comprises:

generating a modified counter value in response to providing the message comprising the obfuscated identifier and the encrypted identifier; and storing the modified counter value.

3. The computer-implemented method of claim 2, further comprising:

generating, by the device, a subsequent encrypted identifier utilizing the identifier, the modified counter value, and the unique derivation key;

storing, by the device, the subsequent encrypted identifier;

generating, by the device, a subsequent obfuscated identifier based at least in part on the portion of the identifier and a portion of the subsequent encrypted identifier; and providing, by the device, a subsequent message comprising at least the subsequent obfuscated identifier and the subsequent encrypted identifier.

4. The computer-implemented method of claim 1, wherein the portion of the obfuscated identifier comprises a right-most seven digits of the encrypted identifier.

5. The computer-implemented method of claim 1, wherein the dynamic value comprises at least one of: a counter, a date, a time, or a transaction value.

6. The computer-implemented method of claim 1, wherein providing the obfuscated identifier and the encrypted identifier causes the central server computer to perform operations comprising:

deriving the unique derivation key utilizing a master derivation key and a portion of the obfuscated identifier;

generating a decrypted value from the encrypted identifier of the authorization request message utilizing the unique derivation key;

modifying the authorization request message to include at least a portion of the decrypted value; and transmitting the modified authorization request message to an authorization computer for authorization.

7. The computer-implemented method of claim 1, further comprising calculating a Luhn checksum value based at least in part on the obfuscated identifier, wherein the authorization request message further comprises the Luhn checksum value.

8. The computer-implemented method of claim 1, wherein the unique derivation key obtained is derived during a personalization process associated with the device.

9. The computer-implemented method of claim 1, wherein the encrypted identifier is decrypted using a second unique derivation key that is derived from eight left-most digits of the obfuscated identifier that is populated in the first data field, the second unique derivation key being derived using a corresponding encryption algorithm that utilizes a master derivation key as a first input and the eight left-most digits of the obfuscated identifier as a second input.

10. A computing device, comprising:

one or more processors; and one or more memories storing computer-executable instructions, wherein executing the computer-executable instructions by the one or more processors, causes the computing device to:

obtain a unique derivation key;

obtain a dynamic value;

concatenate an identifier and the dynamic value to generate a concatenated value;

generate an encrypted identifier based on encrypting the concatenated value by inputting the unique derivation key and the identifier into an encryption algorithm, the identifier being a 16-digit primary account identifier;

generate an obfuscated identifier based at least in part on a portion of the identifier and a portion of the encrypted identifier, the obfuscated identifier maintaining routing information of the 16-digit primary account identifier;

provide the obfuscated identifier to an access device, causing the access device to populate a first data field of an authorization request message with the obfuscated identifier prior to transmitting the authorization request message to a central server computer, the first data field being previously associated with identifying primary account identifiers, wherein populating the first data field with the obfuscated identifier maintains the ability to utilize checksum algorithm-based error checking for the first data field; and provide the encrypted identifier to the access device, causing the access device to populate a second data field of the authorization request message with the encrypted identifier prior to transmitting the authorization request message to the central server computer, wherein populating the second data field with the encrypted identifier instead of the first data field reduces an ability of a nefarious actor to identify the 16-digit primary account identifier from the authorization request message or to track the 16-digit primary account identifier across authorization request messages.

11. The computing device of claim 10, wherein the obfuscated identifier and the encrypted identifier are provided to the access device in a message, and wherein the computing device is further configured to:

generate a modified counter value in response to providing the message comprising the obfuscated identifier and the encrypted identifier; and store the modified counter value.

12. The computing device of claim 11, wherein the computing device is further configured to:

generate a subsequent encrypted identifier utilizing the identifier, the modified counter value, and the unique derivation key;

store the subsequent encrypted identifier;

generate a subsequent obfuscated identifier based at least in part on the portion of the identifier and a portion of the subsequent encrypted identifier; and provide a subsequent message comprising at least the subsequent obfuscated identifier and the subsequent encrypted identifier.

13. The computing device of claim 10, wherein the portion of the obfuscated identifier comprises a right-most seven digits of the encrypted identifier.

14. The computing device of claim 10, wherein the dynamic value comprises at least one of: a counter, a date, a time, or a transaction value.

15. The computing device of claim 10, wherein providing the obfuscated identifier and the encrypted identifier causes the central server computer to perform operations comprising:

deriving the unique derivation key utilizing a master derivation key and a portion of the obfuscated identifier;

generating a decrypted value from the encrypted identifier of the authorization request message utilizing the unique derivation key;

modifying the authorization request message to include at least a portion of the decrypted value; and transmitting the modified authorization request message to an authorization computer for authorization.

16. The computing device of claim 10, wherein the computing device is further configured to calculate a Luhn checksum value based at least in part on the obfuscated identifier, wherein the authorization request message further comprises the Luhn checksum value.

* * * * *